United States Patent [19]

Nakahara et al.

[11] Patent Number: 5,288,790
[45] Date of Patent: Feb. 22, 1994

[54] METHOD FOR PRODUCING SPHERICAL FINE PARTICLES OF COLORED RESIN

[75] Inventors: Saburo Nakahara; Yasuhiro Yamamoto; Yohji Akazawa; Masao Baba, all of Hyogo; Yoshikuni Mori, Osaka, all of Japan

[73] Assignee: Nippon Shokubai Co., Ltd., Osaka, Japan

[21] Appl. No.: 82,525

[22] Filed: Jun. 25, 1993

Related U.S. Application Data

[63] Continuation of Ser. No. 758,145, Sep. 12, 1991, abandoned.

[30] Foreign Application Priority Data

Feb. 25, 1991 [JP] Japan ................................ 3-030207

[51] Int. Cl.⁵ .......................... C08J 5/10; C08K 3/04; C08L 61/26
[52] U.S. Cl. ..................................... 524/495; 524/597
[58] Field of Search ................................ 524/495, 597

[56] References Cited

U.S. PATENT DOCUMENTS 4,910,113  3/1990  Mori et al. ........................ 430/106

FOREIGN PATENT DOCUMENTS 57-22324   2/1982  Japan .
58-17169   2/1983  Japan .
63-10671   1/1988  Japan .
63-048320  3/1988  Japan .
235742     4/1945  Switzerland .
1433183    4/1976  United Kingdom .
1534504   12/1978  United Kingdom .
1538763    1/1979  United Kingdom .

OTHER PUBLICATIONS

Week 8814, Derwent Publications Ltd., London, GB; AN 88–096391, dated Aug. 14, 1986.
English Language Translation of Swiss Patent No. CH-A-235742.

Primary Examiner—Paul R. Michl
Assistant Examiner—U. K. Rajguru
Attorney, Agent, or Firm—Lowe, Price, LeBlanc & Becker

[57] ABSTRACT

Spherical fine particles of colored resin are provided. The fine particles are of a spherical shape and are superior in heat resistance, solvent resistance, and chemical resistance, and sufficiently satisfactory in durability and coloring, and industrially advantageous. The spherical fine particles of colored resin are made by incorporating an amino resin cured matter and an inorganic pigment into one body, and a ratio of the inorganic pigment against a total amount of the amino resin cured matter and inorganic pigment is in a range of from about 1 to 30% by weight.

4 Claims, No Drawings ic # METHOD FOR PRODUCING SPHERICAL FINE PARTICLES OF COLORED RESIN This application is a continuation application of application Ser. No. 07/758,145, filed Sep. 12, 1991 now abandoned.

BACKGROUND OF THE INVENTION

The present invention relates to spherical fine particles of a colored resin which are used for colorants for coating, ink, plastic, fiber, rubber, etc., and for delusterants, fillers, toners and carriers for an electrostatic duplicating machine as well as cosmetics, etc. In more detail, the invention relates to spherical fine particles of a colored resin which are industrially useful and of a new type and made by incorporating an amino resin cured matter and an inorganic pigment into one body, and relates to a method for producing the particles.

Hitherto, various kinds of spherical fine particles of colored resin have been used for plastic, coating, ink, cosmetics, etc. and also, employed exhibiting a characteristic in the respective use. The spherical fine particles of colored resin are made by incorporating a dye or pigment with a resin into one body. Like this, the reason why the dye and pigment are used as one body being incorporated with the resin, but not used in their original form is due to elevation of an affinity to a polymer such as coating, ink, plastic, fiber, rubber, etc. Also, when the fine particles are spherical, compared with a case where the particles are not of such type, there is an advantage such as elevation of fluidity during a shaping process and also, in a case where the particles are used for coating, fiber, etc., an advantage so that a surface becomes smooth and that a filling amount can be increased.

Spherical fine particles of a colored resin obtained by combining a thermosetting resin such as a phenol resin, an epoxy resin, etc. or a thermoplastic resin such as an acrylic resin, a vinyl resin, etc. with an organic dye or an organic pigment are superior in clearness and coloring, while they have a tendency to be inferior in heat resistance, light resistance, solvent resistance, weathering resistance, bleeding resistance, etc. On the other hand, spherical fine particles of a colored resin, in which an inorganic pigment has been used for coloring, are superior to those, in which a dye has been used, in points of solvent resistance, light resistance, heat resistance, and bleeding resistance, and also, superior to those, in which an organic pigment has been used, in points of light resistance and heat resistance.

There have been known, as fine particles of a colored resin made by coloring a thermoplastic resin with a pigment, for example, fine particles of a colored resin obtained by blending and pulverizing a thermoplastic resin and a pigment (Japanese Official Patent Provisional Publication, showa 58-17169), spherical fine particles of a colored resin obtained by adding a pigment into a reaction mixture of a suspension polymerization etc. (Japanese Official Patent Gazette, showa 57-22324), and spherical fine particles of a colored resin obtained by coating a pigment after carrying out chemical or physical treatment on the surfaces of fine particles of a thermoplastic resin (Japanese Official Patent Provisional Publication, showa 63-10671).

Furthermore, as spherical fine particles of a colored resin made by coloring a thermosetting resin with a pigment, there have been known, for example, spherical fine particles of a colored thermosetting resin which is made by adding a pigment when synthesizing a thermosetting resin such as a phenol resin, an epoxy resin, etc. by a polyaddition and addition condensation reaction.

There is such a problem that the hitherto-known spherical fine particles of a colored resin, in which the forementioned thermoplastic resin is used, are inferior in heat resistance, solvent resistance, chemicals resistance, etc., bad in adhesion between the resin particles and pigment, and also, bad in smoothness on the surface of colored particles.

Besides, there is such a problem that the hitherto-known spherical fine particles of a colored resin, in which the forementioned thermosetting resin is used, are broad in particle distribution, are not fine particles of a real sphere type, have a defect that the particles are breakable, and become expensive by classification etc. being required in some of the use.

SUMMARY OF THE INVENTION

The present invention solves the defects and problems of spherical fine particles of a colored resin obtained by the forementioned hitherto-known art, and it has an object to provide a process for producing spherical fine particles of a colored resin and such spherical fine particles of a colored resin, wherein the particles are of a sphere type and superior in heat resistance, solvent resistance, and chemicals resistance, are able to be made in a real sphere type, are fully satisfactory in durability and coloring, and are industrially advantageous.

In order to solve the forementioned object, the present invention provides a process for producing spherical fine particles of a colored resin, wherein an amino resin and inorganic pigment are blended and formed into a suspension, a polycondensation reaction is carried out under a suspension condition, and thus, the amino resin cured matter and inorganic pigment are incorporated into one body so that a proportion of the inorganic resin against a total amount of the amino resin cured matter and the inorganic pigment is in a range of from about 1 to 30 percent by weight (hereinafter, the "percent by weight" is simply referred to as "percent" or "%", unless especially defined).

The present invention, also, provides a process for producing spherical fine particles of a colored resin as above-mentioned, being characterized by that the amino resin is an initial reaction product of formaldehyde with an amino compound in which at least one kind of guanamine selected from a group consisting of benzoguanamine, cyclohexanecarboguanamine, cyclohexenecarboguanamine amounts to a weight percent of from about 40 to about 100, and that the inorganic pigment is carbon black and processed with a compound which has a functional group having a reactivity and/or an affinity with a functional group of the carbon black.

Also, in order to solve the forementioned object, the present invention provides spherical fine particles of a colored resin, which comprises incorporating an amino resin cured matter and an inorganic pigment into one body and a proportion of the inorganic pigment against a total amount of the amino resin cured matter and the inorganic pigment being in a range of from about 1 to 30 percent by weight, wherein the amino resin cured matter is a reaction product of formaldehyde with an amino compound in which at least one kind of guanamine selected from a group consisting of benzoguanamine, cyclohexanecarboguanamine, cyclohexenecarboguanamine amounts to a weight percent of from about 40 to about 100, and the inorganic pigment is carbon black and processed with a compound which has a functional group having a reactivity and/or an affinity with a functional group of the carbon black.

In the present invention, it is required that a proportion of the inorganic pigment against a total amount of the amino resin cured matter and the inorganic pigment is in a range of from about 1 to 30 percent. If the inorganic pigment proportion is less than the range, there occurs a problem that the spherical fine particles of a colored resin is lacking in the coloring and, if the proportion is larger, there occurs a problem that the whole amount of the inorganic pigment is not fixed to the amino resin, particles have a distorted shape, and particle distribution becomes broad. Besides, the use of amino resin brings an benefit that spherical fine particles of a colored resin superior in heat resistance, solvent resistance, and chemicals resistance can be made.

The inorganic pigment and amino resin cured matter are incorporated into one body by the spherical fine particles of a colored resin in the present invention being produced, for example, as the undermentioned. With this, said spherical fine particles of a colored resin are colored by the inorganic pigment. That the spherical fine particles of a colored resin in the present invention have a sphere shape means, for example, to have a particle diameter ratio (the major axis/the minor axis), which is determined by the images of 200 pieces of the spherical fine particles taken by an an electron microscope, in a range of from about 1.0 to 1.25.

The amino resin in the present invention is a resin obtained from a polycondensation reaction of at least one or two or more kinds of amino compounds with formaldehyde, wherein the amino compounds have two or more of the amino group intramolecularly and are selected from, for example, a group consisting of urea, melamine, benzoguanamine, cyclohexanecarboguanamine, cyclohexenecarboguanamine, norbornanecarboguanamine, norbornenecarboguanamine, etc., and also, the amino resin may be converted into an ether with an alcohol. As mentioned later, in a case where processed carbon black is used (the term "CB" used herein is employed to mean "carbon black"), it is preferred to use as the amino resin an initial reaction product which is made by a polycondensation reaction of an amino compound with formaldehyde (a preliminary condensation product), wherein the amino compound is such that at least one kind of guanamine selected from benzoguanamine, cyclohexanecarboguanamine, and cyclohexenecarboguanamine amounts to a percent of from about 40 to 100, and furthermore, the initial reaction product may be converted to an ether. In a case where processed CB is used, the reason why the amino resin of such a kind is preferred for use is due to a fact that the resin has a good affinity with the processed CB and that CB can be uniformly dispersed.

It is preferred to use, as an amino resin using in the present invention, an initial reaction product of an amino resin having a methanol mixing degree of 400% or less. The methanol mixing degree of an initial reaction product represents a polycondensation proportion of the amino resin, and it is a value derived by dissolving 2 g of the initial reaction product into 5 g of methanol, dropping water into a thus-obtained solution while maintaining it at 25° C., determining the amount by weight of water required to get white muddiness, and multiplying a weight ratio between the water and the initial reaction product by 100.

The inorganic pigment used in the present invention is not especially limited on the kind and shape and, for example, one or two or more kinds of compounds selected from titanium oxide, iron oxide, zinc oxide, barium sulfate, calcium sulfate, barium carbonate, calcium carbonate, magnesium carbonate, talc, clay, carbon black, etc. are used, and to elevate coloring (elevation of dispersibility into resin etc), it is preferred to make the particle diameter at 5 μm or less by, in case of necessity, treating with a pulverizer such as a ball mill etc. and more preferable is to make it at 0.1 μm or less. By using an inorganic pigment, spherical fine particles of a colored resin will have a hiding power. When spherical fine particles of a colored resin like the above are used, for example, it is possible to arrange so as not to appear the color of a surface to be coated (or a substrate) and also, possible to color so as not to be inferior to other colors.

In the present invention, the amount for use of an inorganic pigment may be properly determined so that an inorganic pigment being contained in the spherical fine particles of a colored resin is in a proportion of from about 1 to 30%, more preferably from about 5 to 20% against a total amount of the amino resin cured matter and inorganic pigment. In order to make such a proportion, although depending upon the kinds of the amino resin and inorganic pigment, the inorganic pigment is used, for example, in a proportion of from about 0.9 to 27% against a total amount of the amino resin and inorganic pigment.

The inorganic pigment used in the present invention may be subjected to surface-processing in order to elevate the dispersibility to an amino resin. Besides, at least either one of the dye and organic pigment may be used as an auxiliary means. Especially, when the CB is a matter processed with a compound (A) which has a functional group having a reactivity and/or an affinity with a functional group existing on the CB surface, spherical fine particles of a black color resin, which is superior in dispersibility into an initial compound of an amino compound with formaldehyde and superior in coloring, can be obtained.

When the forementioned compound (A) has a reactive functional group capable of easily reacting with a functional group (for example, —OH, —COOH, —C=O, etc.) existing on a surface of CB and/or has a functional group having an affinity with the functional group of CB, the compound (A) can be used without special limitation. The compound (A) may be a monomer or a polymerizable monomer having one or more of groups such as, for example, an aziridine group, oxazoline group, a N-hydroxyalkylamido group, an epoxy group, a thioepoxy group, an isocyanate group, a hydroxyl group, an amino group, imino group, etc., or as occasion demands, it may be a compound which is obtained by polymerizing one or two or more kinds of polymerizable monomers according to a procedure known in public. Practical examples of the compound (A) are, for example, a polyethyleneimine having an average molecular weight of from about 300 to 100,000, a polyethylene glycol glycidyl ether having an average molecular weight of from about 70 to 100,000, a (poly-)alkylene glycol having an average molecular weight of from about 200 to 10,000, their derivatives, etc. And as a practical example of the polyethylene glycol glycidyl ether, for example, there is cited a compound shown by the general formula (1):

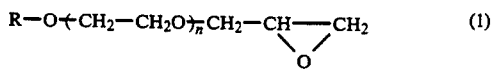

(Here, R is a hydrogen atom or at least one kind of group selected from a group consisting of an alkyl group which has 1 to 20 carbon atoms and may have a substituent group; an aryl group; and an unsaturated aliphatic residual group, and n is an integer of 1 to 30.)

To process CB with the compound (A), for example, the following procedure is carried out. Using a kneader (a mulling device), the CB and compound (A) are warmed up to a certain temperature with sufficient kneading and thereby, a reactivity and an affinity between a functional group on the CB surface and a functional group of the compound (A) are elevated.

A preferable suspending agent used in the present invention is such as making a protective colloid and, for example, a polyvinyl alcohol, polyvinylpyrrolidone, carboxymethylcellulose, an alkali metal salt of a polyacrylic acid, an alkali metal salt of a styrene-maleic acid copolymer, etc. and, among them, a polyvinyl alcohol is especially preferred. The suspension using a suspending agent in the present invention can be carried out either by directly adding a suspending agent into a system, which is made by adding followed by blending a specific amount of an inorganic pigment into an amino resin, or by separately arranging an aqueous solution of a suspending agent, to which a mixture of an amino resin and inorganic pigment is added, and which is followed, to give a strong shearing force, by stirring with an agitator, for example, a colloid mill, dispersing mill, homomixer, homogenizer, etc. The amino resin preferably used in the forementioned suspention process is an initial reaction product having a methanol mixing degree (an extent in condensation polymerization proportion) of 400% or less and more preferable is an initial reaction product having the mixing degree of 200% or less. The particle diameter becomes larger by making the methanol mixing degree smaller, and it becomes smaller by making the degree larger. If the methanol mixing degree becomes larger than 400%, the hydrophilicity becomes too large resulting in difficulty in getting monodispersed particles. Besides, although the condensation degree of the initial reaction product of the amino resin can be controlled with the methanol mixing degree as described above, it is also controlled with GPC (gel permeation chromatography), LC (liquid chromatography), and the acetone mixing degree. Among these controlling means, it is preferred to control it with the acetone mixing degree from viewpoints of operation and reproducibility. The acetone mixing degree represents a polycondensation degree of an amino resin, and it is a value derived by dissolving 2 g of the initial reaction product into 5 g of acetone, dropping water into this solution while maintaining it at 25° C., determining the amount by weight of water required to get white muddiness, and multiplying a weight ratio between the water and initial reaction product by 100. A preferable acetone mixing degree of the initial reaction product is in a range of from about 50 to 500% and more preferable is in a range of from about 100 to 300%. If the acetone mixing degree exceeds 500%, the particles become difficult to obtain and, if becomes 50% or less, spherical fine particles are difficult to obtain.

A preferable amount for addition of a suspending agent is in a range of from about 1 to 30% and more preferable is in a range of from about 2 to 10% against the amino resin. The particle diameter can be smaller by increasing the amount for addition of the suspending agent, and the diameter can be larger by decreasing the amount for addition. If the amount for addition becomes less than 1%, suspension may be not possible and, if it exceeds 30%, fine particles obtained by the curing may become difficult to separate those as monoparticles. The particle diameter becomes smaller with raising the stirring-efficiency and it becomes larger with lowering the efficiency. This is because the raising and lowering of stirring efficiency for getting a suspended state relates to magnitude of a force to shear the initial reaction product. Like this, by choosing properly the polycondensation degree of an amino resin, the amount of a suspending agent, and the stirring efficiency, spherical fine particles of a colored resin having a real sphere shape and narrow particle distribution and having a particle diameter intended in the present invention can be optionally synthesized. That the spherical fine particles of a colored resin in the present invention have a sphere shape means to have the particle diameter ratio (the major axis to the minor axis), which is determined by the images of 200 pieces of the spherical fine particles taken by an an electron microscope, in a range of from about 1.0 to 1.1.

The curing catalyzer used in the present invention is a polycondensation catalyzer of the amino resin and, for example, it is one or two or more kinds properly selected from a mineral acid such as hydrochloric acid, sulfuric acid, phosphoric acid, etc.; a carboxylic acid such as benzoic acid, phthalic acid, acetic acid, propionic acid, salicylic acid, etc.; an ammonium salt such as ammonium chloride ammonium phosphate, etc.; a sulfonic acid such as benzenesulfonic acid, para-toluenesufonic acid, dodecylbenezenesulfonic acid, etc. The forementioned curing catalyzer is preferably used in a range of from about 0.01 to 10% (in a case where processed CB is used, from about 0.01 to 5%) against a solid component in an amino resin emulsified matter which is not yet cured, but colored with an inorganic pigment (but the pigment is not taken in account), and more preferably, in a range of from about 0.2 to 5% (in a case where processed CB is used, from about 0.2 to 2%). If the amount for addition of a curing catalyzer is too large, the emulsified state may be destroyed and a gathered matter be formed and, if the amount for addition is too small, the curing may be insufficient or requires a long period of time. The curing is carried out by maintaining a curing matter at a temperature in a range of, for example, from about 10° to 200° C. for 1 hour and then, maintaining it at a temperature in a range of from about 40° to 200° C. under an ordinary or a raised pressure, and the curing-finish is the when the cured matter becomes insoluble in acetone, methanol, methyl ethyl ketone, dioxane, dimethylformamide, etc.

At the curing-finish, separation of the spherical fine particles of a colored resin is carried out according to a method known in public and various kinds of separation methods and, for example, separation by natural sedimentation or centrifugal sedimentation combined with decantation, separation by filtration, etc. are freely adopted. The spherical fine particles of a colored resin obtained by the separation, in order to be able to obtain in a form of paste and dispersion, are dispersed in water and various kinds of organic solvents, for example, a nonpolar solvent such as toluene, xylene, etc.; a polar solvent such as methyl ethyl ketone, methanol, ethanol, isopropyl alcohol, dimethylformamide, tetrahydrofuran, etc.; and a mixed solvent consisting of these solvents. The spherical fine particles of a colored resin, after the separation procedure, is dried according to a method known in public such as natural drying, drying under a reduced pressure, and drying by a hot wind. Since the intended heat resistance, water resistance, solvent resistance, etc. of the spherical fine particles of a colored resin are further elevated by carrying out heat processing at the temperature from 100° to 200° C. after the drying procedure, it is preferred, in case of necessity, to carry out such heat processing. However, when the drying process is carried out at a relatively high temperature, it turns out that the heat-processing is simultaneously carried out, and therefore, in this case the heat-processing becomes unnecessary. The spherical fine particles of a colored resin, after drying, is crushed by a force to break a gathered state, wherein the force is given by a pulverizer such as a ball mill, hammer mill, jet mill, to obtain the fine particles of a colored resin, after the drying, as a fine powder. Also, it is possible that the spherical fine particles of a colored resin is, after the drying, dispersed in a solvent to obtain in a form of paste or dispersion.

When the spherical fine particles of a colored resin in the present invention is produced by carrying out, for example, a polycondensation reaction under a suspension, they have an average particle diameter in a range of from about 0.1 to 50 μm, but may have an average particle diameter out of the range.

Besides, in the present invention, that the polycondensation reaction is carried out under a suspension means to carry out a polycondenzation reaction under a condition that liquid drops are dispersed in a dispersion medium, and the reaction is not limited to the emulsion polymerization, but includes the suspension polymerization etc.

The spherical fine particles of colored resin and methods for producing those have the undermentioned superior points compared with hither to-known ones.

① The spherical fine particles of colored resin of the present invention are excellent in various properties, which the amino resin has as original superior properties, for example, in heat resistance, solvent resistance, chemicals resistance, and durability.

② The spherical fine particles of colored resin of the present invention are excellent in affinities with plastics such as thermoplastic resin and thermosetting resin, natural rubber, synthetic rubber, printing ink, and vehicle of coating.

③ Since the spherical fine particles of colored resin of the present invention are excellent in the coloring, have a real spherical shape, and narrow in the particle distribution, the fluidity during time of processing becomes good in using in combination with a resin for molding, and also, working efficiency is elevated. Also, by optional each other's blending of the spherical fine particles of colored resins which differ in the color and particle diameter, it is possible to carry out various kinds of coloring in a fashion which is different from the hithertoused pigments.

④ The method for producing spherical fine particles of colored resin of the present invention can produce spherical fine particles of colored resin having a real spherical shape, being narrow in the particle distribution, showing uniform dispersion of an inorganic pigment, and being superior in the coloring, without damaging various superior properties which the amino resin originally has, for example, heat resistance, solvent resistance, chemicals resistance, and durability.

⑤ The spherical fine particles of colored resin of the present invention can be produced with controlling the particle diameter of the spherical fine particles of colored resin in a range of from about 0.1 to 50 μm by an industrially advantageous method.

DESCRIPTION OF THE PREFERRED EMBODIMENTS

Hereinafter, practical examples and comparative examples are presented, but the present invention is not limited within the undermentioned examples.

In Table 1, synthetic conditions of the examples of from 1 to 6 and comparative examples of from 1 to 4 are summarized and listed.

EXAMPLE 1

In a flask equipped with a stirrer, reflux condenser, and thermometer were placed 150 g (0.8 moles) of benzoguanamine, 162 g of formalin of 37% concentration (2.0 moles of formaldehyde), and 0.65 g of a 10% aqueous solution of sodium carbonate, and the mixture was allowed to react with stirring for 5 hours at a temperature of 94°-95° C., whereby an initial reaction product having a methanol mixing degree 60% and an acetone mixing degree 250% was obtained. To this initial reaction product was added 20 g of titanium oxide (TA-100, made by Fuji Titanium Industry Co., Ltd.) and the mixture was allowed to react with stirring for 30 minutes, whereby an initial reaction product white-colored by titanium oxide was obtained. Independently, an aqueous solution which was prepared by dissolving 10.5 g of Kuraray poval 205 (a partially hydrolyzed product of polyvinyl alcohol, made by Kuraray Co., Ltd.) into 145 g of water was warmed up to 90° C. and then, stirred at 6000 rpm using a homomixer (a M model, made by Tokushu Kika Kogyo Co., Ltd.). To an aqueous Kuraray poval solution under stirring was added the forementioned white-colored initial reaction product to obtain a suspended solution of a white color. To this suspended solution cooled at 40° C. was added 4.5 g of dodecylbenzenesulfonic acid, and the mixture was slowly warmed and stirred with heating at each of temperatures of 50°, 70°, and 80° C. for respective 2 hours in continuation, whereby was obtained a solution suspended with the spherical fine particles of a colored resin which was cured by a polycondensation reaction under a suspension condition. When this suspension solution was subjected to an observation by an optical microscope (600 times enlargement), it was seen that the solution comprises fine particles having a spherical shape of about 4 μm particle diameter. The spherical fine particles of colored resin were separated with filtration from the suspension solution, rinsed with water, dried at 100° C. for 1 hour, then treated with heating at 150° C. for 3 hours, and crushed lightly in a mortar, whereby a powder of spherical fine particles of colored resin having a bright white color was obtained.

In observing the electron microscope images of 200 pieces of the fine particles taken by a scanning electron microscope (S-570 model, made by Hitachi Seisaku-Sho), the spherical fine particles of colored resin thus-obtained have a particle diameter ratio (the major axis/the minor axis) of 1.05 and, since titanium oxide not converted into particles is not found, it was understood that almost all of titanium oxide are dispersed into the spherical fine particles of colored resin. When the particle diameter of these spherical fine particles of colored resin was measured by a Coulter counter (TA-2 model, made by Coulter Co., Ltd.), it was found that the average particle diameter was 4.25 μm and the particle distribution was very sharp. Besides, the coloring, heat resistance, dispersing property, and water resistance of these spherical fine particles of colored resin were investigated as follows. It was found that these spherical fine particles of colored resin were spherical fine particles of a white color superior in the coloring, heat resistance, dispersing property, and water resistance. Results are shown in Table 2.

The coloring was compared, using a color-difference meter, in the hue between the pigment used and the fine particles of colored resin obtained, and it was evaluated by the following standards.

Circle ◯: color-difference between the inorganic pigment alone and the fine particles of colored resin is 10% or less.

Triangle △: color-difference between the inorganic pigment alone and the fine particles of colored resin exceeds 10% and is less than 20%.

Cross X: color-difference between the inorganic pigment alone and the fine particles of colored resin is 20% or more.

The heat resistance was investigated, according to JIS K-5101 (16), by shape-variation resulting from treatment at 180° C. for 2 hours and evaluated by the following standards.

Circle ◯: the particle diameter ratio was determined after testing for the heat resistance and a difference in comparison with a nontreated matter was less than 10%.

Cross X: the particle diameter ratio was determined after testing for the heat resistance and a difference in comparison with a nontreated matter was 10% or more.

The dispersing property was investigated according to JIS K-5101 (7) by sufficiently kneading 20 g of a printing varnish with 5 g of fine particles of a colored resin, then making by a grind meter a gutter which corresponds to three times of an average particle diameter of the powder, and examining a trace of the gutter. The dispersing property was evaluated by the following standards.

Success in examination: there are lines of less than 3 in the gutter trace.

Failure in examination: there are 3 lines or more in the gutter trace.

The water resistance was investigated, according to JIS K-5101 (12), by taking about 0.5 g of spherical fine particles of a colored resin into a glass-made test tube, adding 10 ml of water, heating up to 95° C., standing for cooling, and examining the hue, and it was evaluated by the following standards.

Colorless and transparent: since the pigment has not fallen off from the spherical fine particles of colored resin, the water resistance is good.

Slight, white muddiness: since the pigment has fallen off from the spherical fine particles of colored resin, the water resistance is bad.

Light black color: since the pigment has fallen off from the spherical fine particles of colored resin, the water resistance is bad.

EXAMPLES 2~4 AND COMPARATIVE EXAMPLES 1~3

The procedure of Example 1 was repeated except that the concentrations of the resin and pigment and the amounts of the suspending agent and the stirring velocity were changed to the conditions described in Table 1, whereby spherical fine particles of colored resins were obtained.

The results are presented in Table 2.

EXAMPLE 5

The procedure of Example 1 was repeated except that 20 g of $Fe_3O_4$ (a spinel type, made by Mitsubishi Metal Corporation) were used instead of titanium oxide, whereby spherical fine particles of a colored resin were obtained.

These spherical fine particles of colored resin had an average particle diameter of 5.11 μm (a value by a Coulter counter) and were spherical fine particles of black resin and, similar to the case of Example 1, they showed a real sphere shape and were superior in the coloring, heat resistance, dispersing property, and water resistance.

Results are presented in Table 2.

EXAMPLE 6

In a flask equipped with a stirrer, reflux condenser, and thermometer were placed 112 g (0.6 moles) of benzoguanamine, 25 g of melamine (0.2 moles), 145 g of formalin of 37% concentration (1.8 moles of formaldehyde), and 0.65 g of a 10% aqueous solution of sodium carbonate, and the mixture was allowed to react with stirring for 6 hours at a temperature of 94°–95° C., whereby an initial reaction product having a methanol mixing degree 35% and an acetone mixing degree 150% was obtained. To this initial reaction product was added 15 g of carbon black (MA 600, made by Mitsubishi Kasei Corporation) and the mixture was stirred for 30 minutes, whereby an initial reaction product black-colored by carbon black was obtained. Independently, an aqueous solution which was prepared by dissolving 7.5 g of Kuraray poval 205 (a partially hydrolyzed product of polyvinyl alcohol, made by Kuraray Co., Ltd.) into 140 g of water was warmed up to 90° C. and then, stirred at 6000 rpm using a homomixer (a M model, made by Tokushu Kika Kogyo Co., Ltd.). To an aqueous Kuraray poval solution under stirring was added the forementioned black-colored initial reaction product to obtain a suspended solution of a black color. To this solution cooled at 40° C. was added 4.1 g of dodecylbenzenesulfonic acid, and the mixture was slowly warmed and stirred with heating at each of temperatures of 50°, 70°, and 90° C. for respective 2 hours in continuation, whereby was obtained a solution suspended with the spherical fine particles of a colored resin which was cured by a polycondensation reaction under an emulsified condition. When this suspension solution was subjected to an observation by an optical microscope (600 times enlargement), it was seen that the solution comprises fine particles having a spherical shape of about 6 μm particle diameter. The spherical fine particles of colored resin were separated with filtration from the suspension solution, rinsed with water, dried at 100° C. for 1 hour, then treated with heating at 150° C. for 5 hours, and crushed lightly in a mortar, whereby a powder of spherical fine particles of colored resin having a bright black color was obtained.

In observing the thus-obtained colored resin fine particles by a scanning electron microscope, the particle diameter ratio (the major axis/the minor axis) was 1.06 and, since carbon black not converted into particles was not found, it was understood that almost all of carbon black were dispersed into the spherical fine particles of colored resin. When the particle diameter of these spherical fine particles of colored resin was measured by a Coulter counter (TA-2 model, made by Coulter Co., Ltd.), it was found that the average particle diameter was 5.87 μm and the particle distribution was very sharp. Besides, these spherical fine particles of colored resin were spherical fine particles of black resin which were superior in the coloring, heat resistance, dispersing property, and water resistance. Results are shown in Table 2.

COMPARATIVE EXAMPLE 4

In a flask equipped with a stirrer, reflux condenser, and thermometer were placed 2 g of acrylic acid, 240 g of methyl methacrylate, 29 g of divinylbenzene, 50 g of styrene resin, 1 g of azobisisobutyronitrile, and 25 g of carbon black (MA 600, made by Mitsubishi Kasei Corporation) and the mixture was uniformly mixed with sufficient stirring, whereby a black-colored solution was obtained. Independently, an aqueous solution which was prepared by dissolving 17 g of Kuraray poval 205 (a partially hydrolyzed product of polyvinyl alcohol, made by Kuraray Co., Ltd.) into 600 g of water was stirred at 6000 rpm under a nitrogen atmosphere using a homomixer (a M model, made by Tokushu Kika Kogyo Co., Ltd.). To an aqueous Kuraray poval solution under stirring was added the aforementioned black-colored solution and the mixture obtained was warmed up to 80° C. and stood at this temperature for 30 minutes. Then, this mixture was transferred in a four-necked flask and, a polymerization reaction was carried out under a nitrogen atmosphere at 80° C. for 5 hours with stirring and heating, whereby a solution suspended with a black-colored cured resin was obtained. When this suspension solution was subjected to an observation by an optical microscope (600 times enlargement), it was seen that the solution comprises fine particles having a spherical shape of about 6 μm particle diameter. The cured resin was separated with filtration from the suspension solution, rinsed with water, dried at 100° C., and crushed in a mortar, whereby a powder of spherical fine particles of a cured resin having a black color was obtained.

In observing the thus-obtained spherical fine particles of cured resin by a scanning electron microscope, the particle diameter ratio (the major axis/the minor axis) was 1.12 and the carbon black not converted into particles was found.

When the particle diameter of the spherical fine particles of this resin was measured by a Coulter counter, it was found that the average particle diameter was 6.23 μm and the particle distribution was broad. Besides, the spherical fine particles of this resin were bad in the coloring, dispersing property, and water resistance. Results are shown in Table 2.

In Table 1, synthetic conditions of Examples 1~6 and Comparative Examples 1~4 are presented.

TABLE 1

| | Synthetic conditions (footnote 1) | | | | | | |
|---|---|---|---|---|---|---|---|
| | Kind and concentration of resin (% by weight) | Concentration of pigment (% by weight) | Amount of suspending agent (% by weight) | Stirring velocity (rpm) | suspension | Methanol mixing degree (%) | Acetone mixing degree (%) |
| Example 1 | Amino resin 91.3 | 8.7 | 4.8 | 6000 | good | 60 | 250 |
| Example 2 | Amino resin 79.2 | 20.8 | 4.8 | 6000 | good | 60 | 250 |
| Example 3 | Amino resin 91.3 | 8.7 | 10.6 | 6000 | good | 60 | 250 |
| Example 4 | Amino resin 91.3 | 8.7 | 2.8 | 2000 | good | 60 | 250 |
| Example 5 | Amino resin 91.3 | 8.7 | 4.8 | 6000 | good | 60 | 250 |
| Example 6 | Amino resin 92.7 | 7.3 | 3.8 | 6000 | good | 35 | 150 |
| Comparative example 1 | Amino resin 63.6 | 36.4 | 4.8 | 6000 | good | 60 | 250 |
| Comparative example 2 | Amino resin 99.3 | 0.7 | 4.8 | 6000 | good | 60 | 250 |
| Comparative example 3 | Amino resin 91.3 | 8.7 | 0.9 | 2000 | somewhat bad | 60 | 250 |
| Comparative example 4 | Acryl resin 92.8 | 7.2 | 5.0 | 6000 | good | — | — |

(footnote 1)
Concentration of resin: [resin weight/(pigment weight + resin weight)] × 100
Concentration of pigment: [pigment weight/(pigment weight + resin weight)] × 100
Amount of suspending agent: [suspending agent weight/(suspending agent weight + resin weight)] × 100

TABLE 2

| | Physical properties of fine particles of colored resin (footnote 1) | | | | | | | |
|---|---|---|---|---|---|---|---|---|
| | Proportion of resin cured matter (% by weight) | Proportion of pigment (% by weight) | Average particle diameter (μm) | Particle diameter ratio (major axis/ minor axis) | Coloring | Dispersing property JIS K-5101 (7) | Water resistance JIS K-5101 (12) | Heat resistance JIS K-5101 (16) |
| Example 1 | 89.0 | 11.0 | 4.25 | 1.05 | ○ | Success in examination | Colorless transparent | ○ |
| Example 2 | 73.7 | 26.3 | 4.53 | 1.14 | ○ | Success in examination | Colorless transparent | ○ |
| Example 3 | 89.0 | 11.0 | 1.05 | 1.18 | ○ | Success in examination | Colorless transparent | ○ |
| Example 4 | 89.0 | 11.0 | 40.23 | 1.04 | ○ | Success in examination | Colorless transparent | ○ |
| Example 5 | 89.0 | 11.0 | 5.11 | 1.07 | ○ | Success in | Colorless | ○ |

TABLE 2-continued

| | Physical properties of fine particles of colored resin (footnote 1) | | | | | | | |
|---|---|---|---|---|---|---|---|---|
| | Proportion of resin cured matter (% by weight) | Proportion of pigment (% by weight) | Average particle diameter (μm) | Particle diameter ratio (major axis/ minor axis) | Coloring | Dispersing property JIS K-5101 (7) | Water resistance JIS K-5101 (12) | Heat resistance JIS K-5101 (16) |
| Example 6 | 90.9 | 9.1 | 5.87 | 1.06 | ○ | Success in examination | transparent Colorless | ○ |
| Comparative example 1 | 54.0 | 46.0 | 8.32 | 1.32 | ○ | Failure in examination | transparent Slight white-muddy | ○ |
| Comparative example 2 | 99.1 | 0.9 | 4.10 | 1.04 | X | Success in examination | Colorless transparent | ○ |
| Comparative example 3 | 89.0 | 11.0 | 72.15 | 1.36 | △ | Failure in examination | Colorless transparent | ○ |
| Comparative example 4 | 92.8 | 7.2 | 6.23 | 1.22 | △ | Failure in examination | Light black color | X |

(footnote 1)
Proportion of resin cured matter: [resin cured matter weight/(resin cured matter weight + pigment weight)] × 100
Proportion of pigment: [pigment weight/(resin cured matter weight + pigment weight)] × 100

As seen in Table 2, the spherical fine particles of colored resin of Examples 1 to 6 have a spherical shape and were superior in all of the coloring, dispersing property, water resistance, and heat resistance. Whereas, in Comparative Example 1, dispersing property and water resistance were bad because of the high proportion of the pigment. In Comparative Example 2, the coloring was bad because of the low proportion of the pigment. In Comparative Example 3, spherical fine particles were not obtained. This is because the polycondensation reaction was not carried out under a suspension condition. In Comparative Example 4, since an amino resin cured matter was not used, but an acrylic resin cured matter was used, the coloring, dispersing property, and water resistance, and heat resistance were all bad.

Next, in the present invention are presented the examples and comparative examples in a case where carbon black processed is used as an inorganic pigment, but the present invention is not limited within the undermentioned examples.

First, the examples in a case of processing carbon black are presented.

REFERENCE EXAMPLE 1

In a Labo Plasto mill (made by Toyoseiki Seisaku-Sho, Ltd.) were placed 100 parts by weight of MA-600 (made by Mitsubishi Kasei Corporation) as CB and 200 parts by weight of Epomin SP-300 (made by Nippon Shokubai Co., Ltd.), which is a polyethyleneimine having a molecular weight of 30,000, and the mixture was kneaded with stirring at a temperature of 100°~200° C. for 20 minutes and then, cooled to obtain carbon black processed, which is called as CB (1).

REFERENCE EXAMPLE 2

The procedure of the reference example 1 was repeated except that 100 parts by weight of Denacol EX-171 (made by Nagase Chemicals Co., Ltd.), which is a laurylalcoholpolyethylene glycol glycidyl ether having a molecular weight of 902, were used instead of 200 parts by weight of polyethyleneimine, whereby carbon black processed was obtained. This is called as CB (2).

REFERENCE EXAMPLE 3

The procedure of the reference example 1 was repeated except that 100 parts by weight of PEG 1000 (Kanto Chemicals Co., Inc.), which is a polyethylene glycol having an average molecular weight of 1000, were used instead of 200 parts by weight of polyethyleneimine, whereby carbon black processed was obtained. This was called as CB (3).

In Table 3, synthetic conditions of the examples 7~17 and comparative examples 5 and 6 are summarized.

EXAMPLE 7

In a 4-necked flask equipped with a stirrer, reflux condenser, and thermometer were placed 187 g (1.0 mole) of benzoguanamine, 25 g of melamine (0.2 moles), 243 g of formalin of 37% concentration (3.0 moles of formaldehyde), and 0.95 g of a 10% aqueous solution of sodium carbonate, and the mixture was allowed to react with stirring for 3.5 hours at a temperature of 94°-95° C., whereby an initial reaction product having a methanol mixing degree 60% and an acetone mixing degree 250% was obtained. To this initial reaction product was added 67.1 g of CB (2) obtained from the reference example 2 and the mixture was stirred for 30 minutes, whereby an initial reaction product black-colored by CB was obtained. Independently, an aqueous solution which was prepared by dissolving 15.9 g of Kuraray poval 205 (a partially hydrolyzed product of polyvinyl alcohol, made by Kuraray Co., Ltd.) into 183 g of water was warmed up to 90° C. and then, stirred at 6000 rpm using a homomixer (a HW-M model, made by Tokushu Kika Kogyo Co., Ltd.). To an aqueous Kuraray poval solution under stirring was added to the forementioned black-colored initial reaction product to obtain a suspended solution of a black color. To this solution cooled at 40° C. was added 4.62 g of dodecylbenzenesulfonic acid, and the mixture was slowly warmed and stirred with heating at each of temperatures of 50°, 70°, and 90° C. for respective 2 hours in continuation, whereby was obtained a solution suspended with fine particles of a black-colored resin which was cured by a polycondensation reaction under a suspension condition. When this suspension solution was subjected to an observation by an optical microscope (600 times enlargement), it was seen that the solution comprises fine particles having a spherical shape of about 5 μm diameter. The fine particles of black-colored resin were separated with filtration from the suspension solution, rinsed with water, dried at 100° C. for 1 hour, then treated with heating at 150° C. for 5 hours, and crushed lightly in a mortar, whereby a powder of fine particles of a black-colored resin having a bright black color was obtained.

In observing 200 pieces of thus-obtained cured resin fine particles by a scanning electron microscope, the particle diameter ratio (the major axis/the minor axis) was 1.04 and, since carbon black not converted into particles was not found, it was understood that almost all of added CB were dispersed into the fine particles of black-colored resin. When the particle diameter of these fine particles of black-colored resin was measured by a Coulter counter, it was found that the average particle diameter was 5.05 μm and the particle distribution was very sharp. Furthermore, these resin fine particles of black-colored resin, when the coloring, dispersing property, water resistance, etc. were investigated as described above, were found to be sphere fine particles of black-colored resin superior in all the physical properties. Results are shown in Table 5.

EXAMPLES 8~10

The procedure of example 7 was repeated except that the CB (1) and CB (3) obtained from the reference examples 1 and 3 and the nonprocessed CB (the forementioned MA-600) were used instead of the CB (2) under the conditions of Table 3, whereby fine particles of black resins were obtained.

Results are shown in Table 5.

EXAMPLES 11~16 AND COMPARATIVE EXAMPLES 5 AND 6

The procedure of example 7 was repeated except that the CB-added amount, the amount of a suspending agent, the methanol mixing degree, and acetone mixing degree were as shown in Tables 3 and 4, whereby fine particles of black-colored resins were obtained.

Results are shown in Tables 5 and 6.

EXAMPLE 17

The procedure of example 7 was repeated except that benzoguanamine was replaced to cyclohexanecarboguanamine, whereby fine particles of a black-colored resin were obtained.

Results are shown in Table 6.

Besides, the under-described is evaluation standards for the coloring of fine particles of colored resins obtained form the examples 7~17 and comparative examples 5 and 6.

Circle ◯: color-difference between the inorganic pigment alone and the fine particles of colored resin in 5% or less.

Triangle △: color-difference between the inorganic pigment alone and the fine particles of colored resin exceeds 5% and is less than 10%.

Cross X: color-difference between the inorganic pigment alone and the fine particles of colored resin is 10% or more.

In Tables 3 and 4, synthetic conditions of the examples 7~17 and comparative examples 5 and 6 are shown.

TABLE 3

| | Synthetic conditions (footnote 1) | | | | |
|---|---|---|---|---|---|
| | Kind and concentration of resin (% by weight) | Kind and concentration of pigment (% by weight) | Amount of suspending agent (% by weight) | Methanol mixing degree (%) | Acetone mixing degree (%) |
| Example 7 | Amino resin 90.0 | CB (2) 10.0 | 5.0 | 60 | 250 |
| Example 8 | Amino resin 90.0 | CB (1) 10.0 | 5.0 | 60 | 250 |
| Example 9 | Amino resin 90.0 | CB (3) 10.0 | 5.0 | 60 | 250 |
| Example 10 | Amino resin 90.0 | Nonprocessed CB 10.0 | 5.0 | 60 | 250 |
| Example 11 | Amino resin 90.0 | CB (2) 10.0 | 5.0 | 75 | 350 |
| Example 12 | Amino resin 90.0 | CB (2) 10.0 | 5.0 | 35 | 150 |
| Example 13 | Amino resin 90.0 | CB (2) 10.0 | 2.5 | 60 | 250 |

(footnote 1)
Concentration of resin: [resin weight/(pigment weight + resin weight)] × 100
Concentration of pigment: [pigment weight/(pigment weight + resin weight)] × 100
Amount of suspending agent: [suspending agent weight/(suspending agent weight + resin weight)] × 100

TABLE 4

| | Synthetic conditions (footnote 1) | | | | |
|---|---|---|---|---|---|
| | Kind and concentration of resin (% by weight) | Kind and concentration of pigment (% by weight) | Amount of suspending agent (% by weight) | Methanol mixing degree (%) | Acetone mixing degree (%) |
| Example 14 | Amino resin 90.0 | CB (2) 10.0 | 11.0 | 60 | 250 |
| Example 15 | Amino resin 95.0 | CB (2) 5.0 | 5.0 | 60 | 250 |
| Example 16 | Amino resin 80.0 | CB (2) 20.0 | 5.0 | 60 | 250 |
| Example 17 | Amino resin 90.0 | CB (2) 10.0 | 5.0 | 60 | 250 |
| Comparative example 5 | Amino resin 62.0 | CB (2) 38.0 | 5.0 | 60 | 250 |
| Comparative example 6 | Amino resin 99.5 | CB (2) 0.5 | 5.0 | 60 | 250 |

(footnote 1)
Concentration of resin: [resin weight/(pigment weight + resin weight)] × 100
Concentration of pigment: [pigment weight/(pigment weight + resin weight)] × 100
Amount of suspending agent: [suspending agent weight/(suspending agent weight + resin weight)] × 100

TABLE 5

Physical properties of fine particles of colored resin (footnote 1)

|  | Proportion of resin cured matter (% by weight) | Proportion of pigment (% by weight) | Average particle diameter (μm) | Particle diameter ratio (major axis/ minor axis) | Coloring | Dispersing property JIS K-5101 (7) | Water resistance JIS K-5101 (12) | Heat resistance JIS K-5101 (16) |
| --- | --- | --- | --- | --- | --- | --- | --- | --- |
| Example 7 | 87.3 | 12.7 | 5.05 | 1.04 | ○ | Success in examination | Colorless transparent | ○ |
| Example 8 | 87.3 | 12.7 | 4.85 | 1.04 | ○ | Success in examination | Colorless transparent | ○ |
| Example 9 | 87.3 | 12.7 | 5.15 | 1.06 | ○ | Success in examination | Colorless transparent | ○ |
| Example 10 | 87.3 | 12.7 | 4.70 | 1.06 | △ | Success in examination | Colorless transparent | ○ |
| Example 11 | 87.3 | 12.7 | 2.10 | 1.04 | ○ | Success in examination | Colorless transparent | ○ |
| Example 12 | 87.3 | 12.7 | 10.04 | 1.05 | ○ | Success in examination | Colorless transparent | ○ |
| Example 13 | 87.3 | 12.7 | 40.22 | 1.06 | ○ | Success in examination | Colorless transparent | ○ |

(footnote 1)
Proportion of resin cured matter: [resin cured matter weight/(resin cured matter weight + pigment weight)] × 100
Proportion of pigment: [pigment weight/(resin cured matter weight + pigment weight)] × 100

TABLE 6

Physical properties of fine particles of colored resin (footnote 1)

|  | Proportion of resin cured matter (% by weight) | Proportion of pigment (% by weight) | Average particle diameter (μm) | Particle diameter ratio (major axis/ minor axis) | Coloring | Dispersing property JIS K-5101 (7) | Water resistance JIS K-5101 (12) | Heat resistance JIS K-5101 (16) |
| --- | --- | --- | --- | --- | --- | --- | --- | --- |
| Example 14 | 87.3 | 12.7 | 0.85 | 1.05 | ○ | Success in examination | Colorless transparent | ○ |
| Example 15 | 93.7 | 6.3 | 4.95 | 1.03 | ○ | Success in examination | Colorless transparent | ○ |
| Example 16 | 74.7 | 25.3 | 7.31 | 1.07 | ○ | Success in examination | Colorless transparent | ○ |
| Example 17 | 87.3 | 12.7 | 4.97 | 1.05 | ○ | Success in examination | Colorless transparent | ○ |
| Comparative example 5 | 51.9 | 48.1 | 8.13 | 1.22 | ○ | Failure in examination | Light black color | ○ |
| Comparative example 6 | 99.4 | 0.6 | 5.01 | 1.04 | X | Success in examination | Colorless transparent | ○ |

(footnote 1)
Proportion of resin cured matter: [resin cured matter weight/(resin cured matter weight + pigment weight)] × 100
Proportion of pigment: [pigment weight/(resin cured matter weight + pigment weight)] × 100

As seen in Tables 5 and 6, the fine particles of colored resin in the examples 7 to 17 were spherical fine particles of black-colored resin superior in the coloring, dispersing property, water resistance, and heat resistance, and the CB-processed matter has superior coloring in comparison with the CB-nonprocessed matter. In the comparative example 5, since the CB content is over a range of from about 1 to 30%, the average particle diameter and particle diameter ratio became large and the dispersing property was low. In the comparative example 6, since the CB content was lower than a range of from about 1 to 30%, the coloring was bad.

EXAMPLE 18

Sphere fine particles of a black color resin, 10 g, which were obtained in the example 7, 4 g of calcium stearate, 1000 g of cylinder type pellets of polypropylene (K-1014, made by Chisso Corporation) were mixed by a high speed mixer and then, plates having each of thickness 2 mm, 4 mm, and 6 mm were respectively molded by an injection molding Machine (SG 25 type, made by Sumitomo Heavy Industries, Ltd., at a temperature of 250° C.). All the plates obtained have flat and smooth surfaces, gloss, and uniform black color of no color irregularity, and also, they were superior in chemicals resistance, solvent resistance, water resistance, etc.

EXAMPLE 19

Spherical fine particles of a black color resin, 10 g, which were obtained in the example 7, 4 g of calcium stearate, 1000 g of cylinder type pellets of polyethylene (J-40, made by Nippon Petrochemicals Co., Ltd.) were mixed by a high speed mixer and then, plates having each of thickness 2 mm, 4 mm, and 6 mm were respectively molded by an injection molding device (SG 25 type, made by Sumitomo Heavy Industries, Ltd., at a temperature of 200° C.). All the plates obtained have flat and smooth surfaces, gloss, and uniform black color of no color irregularity, and also, they were superior in chemicals resistance, solvent resistance, water resistance, etc.

EXAMPLE 20

Spherical fine particles of a black color resin, 10 g, which were obtained in the example 7, 4 g of calcium stearate, 1000 g of cylinder type pellets of polystyrene (XH 803, made by Asahi Chemical Industry Co., Ltd.) were mixed by a high speed mixer and then, plates having each of thickness 2 mm, 4 mm, and 6 mm were respectively molded by an injection molding device (SG 25 type, made by Sumitomo Heavy Industries, Ltd., at a temperature of 220° C.). All the plates obtained have flat and smooth surfaces, gloss, and uniform black color of no color irregularity, and also, they were superior in chemicals resistance, solvent resistance, water resistance, etc.

EXAMPLE 21

Spherical fine particles of a black color resin, which were obtained in the example 7, were combined with and dispersed into acrylpolyol [trade name "Arotane 207", nonvolatile component 50%, made by Nippon Shokubai Co., Ltd.] so as to make a 30% content of the fine particles (=[spherical fine particles of a black color resin/(spherical fine particles of a black color resin+acrylpolyol)]×100). Even without using a strong dispersing device such as a sand mill, the dispersed condition was excellent. The I solution thus-obtained was combined and well mixed with a polyfunctional isocyanate [trade name "Sumidur", made by Sumitomo Bayer Urethane Co., Ltd.] so as to make a weight ratio of 9 (I solution) to 1 (isocyanate). The dispersed solution thus-obtained was diluted with a thinner composed of a 1:1 mixture solution of toluene and ethyl acetate until viscosity capable of air-spraying is obtained, whereby a coating composition was obtained. This coating composition was coated on a polystyrene plate using an air-spray and compulsorily dried at 60° C. for 30 minutes. The test plate surface thus-obtained showed no irregularity of gloss at all and almost no sandy feel by finger touch. Also, the plate was excellent in anti-alkali and anti-acid properties, solvent resistance, and water resistance.

EXAMPLE 22

Spherical fine particles of a black color resin, which were obtained in the example 7, were combined with and dispersed into an acrylic resin [trade name "Aroset 5227", nonvolatile component 45%, made by Nippon Shokubai Co., Ltd.] so as to make a 30% content of the fine particles (=[spherical fine particles of a black color resin/(spherical fine particles of a black color resin+acrylic resin)]×100). Even without using a strong dispersing device such as a sand mill, the dispersed condition was excellent. The dispersed solution thus-obtained was diluted with a thinner composed of a 1:1 mixture solution of toluene and ethyl acetate until viscosity capable of air-spraying is obtained, whereby a coating composition was obtained. This coating composition was coated on a polystyrene plate using an air-spray and compulsorily dried at 60° C. for 30 minutes. The test plate surface thus-obtained showed no irregularity of gloss at all and almost no sandy feel by finger touch. Also, the plate was excellent in anti-alkali and anti-acid properties, solvent resistance, and water resistance.

EXAMPLE 23

Spherical fine particles of a black color resin, 40 g, which were obtained in the example 7, were combined with 140 g of a compounded varnish for an offset planographic ink and kneaded without using a dispersing agent, but with using three pieces of rolls. The spherical fine particles of a black color resin well dispersed in the varnish. To 100 g of a dispersed slurry thus-obtained were added 4 g of an ink solvent, 0.2 g of a 6% cobalt dryer, and 1.5 g of a 6% manganese dryer and the mixture obtained was kneaded to get a black color ink which converted into an uniform slurry. A printed matter, which was printed by an offset printer using the black color ink, was superior in a degree of black color.

What is claimed are:

1. A process for producing spherical fine particles of a colored resin, the process comprising (a) blending an amino resin and an inorganic pigment, (b) suspending the resulting blend in an aqueous solution of a suspending agent, and (c) polycondensation curing the amino resin contained in the suspended blend to form spherical fine particles, the inorganic pigment comprising from about 1 to about 30 weight percent of the colored fine particles, the amino resin comprising the initial reaction product of formaldehyde and an amino reactant comprising from about 40 to about 100 weight percent of at least one guanamine selected from the group consisting of benzoguanamine, cyclohexanecarboguanamine and cyclohexenecarboguanamine, the inorganic pigment comprising carbon black, and said spherical fine particles having an average particle diameter in a range of from about 0.1 to 50 μm.

2. A process for producing spherical fine particles of a colored resin as claimed in claim 1, wherein the particles comprise from about 5 to about 20 weight percent of the inorganic pigment.

3. A process for producing spherical fine particles of a colored resin as claimed in claim 1, said spherical fine particles having a particle diameter ratio, defined as the major axis to the minor axis, in a range of from about 1.0 to 1.1.

4. A process for producing spherical fine particles of a colored resin as claimed in claim 1, wherein said suspending agent is a protective colloid.

* * * * *